(12) United States Patent
Misra et al.

(10) Patent No.: US 12,535,267 B2
(45) Date of Patent: Jan. 27, 2026

(54) APPARATUS AND PROCESS FOR PRE-LIQUEFACTION FLUID PROCESSING FOR IMPROVED LIQUEFACTION OPERATIONS

(71) Applicant: Air Products and Chemicals, Inc., Allentown, PA (US)

(72) Inventors: Pratik Misra, Breinigsville, PA (US); David M. Espie, Lansdale, PA (US); Gowri Krishnamurthy, Sellersville, PA (US)

(73) Assignee: AIR PRODUCTS AND CHEMICALS, INC., Allentown, PA (US)

( * ) Notice: Subject to any disclaimer, the term of this patent is extended or adjusted under 35 U.S.C. 154(b) by 365 days.

(21) Appl. No.: 18/234,594

(22) Filed: Aug. 16, 2023

(65) Prior Publication Data
US 2025/0060156 A1 Feb. 20, 2025

(51) Int. Cl.
*F25J 1/02* (2006.01)
*F25J 1/00* (2006.01)
*G05B 13/04* (2006.01)

(52) U.S. Cl.
CPC ............ *F25J 1/0252* (2013.01); *F25J 1/001* (2013.01); *F25J 1/0235* (2013.01); *G05B 13/048* (2013.01); *F25J 2210/06* (2013.01)

(58) Field of Classification Search
None
See application file for complete search history.

(56) References Cited

U.S. PATENT DOCUMENTS

| 3,095,274 | A | 6/1963 | Crawford |
| 4,765,813 | A | 8/1988 | Gaumer, Jr. et al. |
| 7,559,213 | B2 | 7/2009 | Allam et al. |
| 8,783,061 | B2 | 7/2014 | Coward |

(Continued)

FOREIGN PATENT DOCUMENTS

EP 3244138 A1 11/2017

OTHER PUBLICATIONS

Buijs K et al: "Shell's LNG technology for 7-10Mtpa LNG trains", Sustaining World Growth—Technology and People : IPTC, International Petroleum Technology Conference ; Nov. 21-23, 2005, Doha, Qatar, Sheraton Doha Conference Center, Qatar International Exhibition Centre ; Proceedings, Jan. 1, 2005 (Jan. 1, 2005), pp. 1-7, XP009116405.

*Primary Examiner* — David Earl Ogg
(74) *Attorney, Agent, or Firm* — Matthew Richard Weaver

(57) ABSTRACT

An apparatus and process for processing of a fluid (e.g. hydrogen) for liquefaction can permit a reduction in power consumption and also an improvement in operational efficiency in flexibility. Embodiments can be configured to account for large variations in feed to be provided for liquefaction and also permit operational cost reductions associated with liquefaction processing so the overall power consumption and operational cost for liquefaction can be greatly reduced while also providing improved operational flexibility. For instance, embodiments can be configured to feed a fluid to multiple liquefiers of a train of liquefiers based on a pre-selected set of feed routing criteria for improving power consumption and providing greater operational flexibility for liquefaction operations.

20 Claims, 5 Drawing Sheets

(56) References Cited

U.S. PATENT DOCUMENTS

| | | | |
|---|---|---|---|
| 2008/0307826 A1* | 12/2008 | Coward | F25J 1/0252 |
| | | | 62/611 |
| 2010/0101272 A1 | 4/2010 | Coward | |
| 2018/0356151 A1* | 12/2018 | Suraganda Narayana | |
| | | | G05B 23/0283 |
| 2021/0356204 A1* | 11/2021 | Bernhardt | F25J 1/0242 |
| 2022/0033983 A1 | 2/2022 | Higginbotham et al. | |
| 2022/0196323 A1* | 6/2022 | Montgomery | F25J 1/0254 |
| 2022/0290309 A1 | 9/2022 | Wehrman et al. | |

* cited by examiner

APPARATUS AND PROCESS FOR PRE-LIQUEFACTION FLUID PROCESSING FOR IMPROVED LIQUEFACTION OPERATIONS

FIELD OF THE INVENTION

The present innovation relates to systems, apparatuses, and processes for controlling how a fluid (e.g. hydrogen gas) is fed to multiple liquefiers of a train of liquefiers to liquify the fluid via the liquefiers and liquefaction apparatuses configured to implement control schemes for feeding a fluid to liquefiers to undergo liquefaction.

BACKGROUND OF THE INVENTION

Hydrogen production can be provided by use of one or more electrolyzers. The electrolyzers can produce hydrogen from water via electrolysis. U.S. Patent Application Publication Nos. 2022/0290309 and 2022/0033983 disclose an example of hydrogen production via one or more electrolyzers in which the produced hydrogen gas can be hydrogen gas can be liquefied by cryogenic cooling. Examples of hydrogen liquefaction can be found in U.S. Pat. Nos. 7,559,213, 4,765,813, and 3,095,274. Hydrogen production that relies on renewable power sources to power operation of various production units can be considered green hydrogen manufacturing.

SUMMARY

We determined that a new process and apparatus for controlling liquefaction of hydrogen gas and other types of gas can be desired to provide improved operational flexibility to account for large variances in hydrogen production that can occur in green hydrogen production due to the inconsistent availability of power for powering operation of the hydrogen production processing (e.g. due to the lack of availability of renewable power from a renewable power source such as, for example, solar power, wind power, etc. For example, we determined that liquefaction of hydrogen gas can be substantially improved upon to reduce operational costs associated with the cryogenic cooling and liquefaction of the gas to provide a significant improvement in operational efficiency that can also reduce power consumption significantly. The reduced power consumption can permit a higher production rate of hydrogen for a given supply of power and/or a lower cost production process that can provide a more economical, and more energy efficient processing to occur. This type of improvement can further enhance utilization of renewable energy that can help avoid or minimize carbon based energy systems for powering operation of hydrogen production facilities.

In some embodiments, the feed of fluid to undergo liquefaction (e.g. a gaseous fluid that is comprised of over 95 volume percent (vol %) hydrogen gas or a fluid that is comprised of over 99 vol % hydrogen gas, or a fluid that is comprised of between greater than 95 vol % hydrogen gas to up to 100 vol % hydrogen gas, etc.) or other liquefaction feed, can be split into multiple fractions for feeding to different liquefiers of a train of liquefiers. The splitting of the feed can be controlled so that each liquefier of the train of liquefiers receives a sufficient amount of feed to operate at a pre-selected minimum operational capacity level while also directing the fractions of the feed to different liquefiers to maximize the efficiency with which the liquefiers can liquify that gas into a liquid. Such a determination can be made based on (1) empirical data of the liquefiers concerning the efficiency at which the liquefiers operate to liquify the feed, (2) ambient temperature that may affect liquefier operations (e.g. temperature of the feed and/or ambient temperature at the liquefiers), (3) maintenance scheduling, and/or (4) a pre-selected set of criteria that is defined to minimize fluctuations in feed allocations to the different liquefiers that may account for relatively momentary feed availability changes that do not have a sufficient duration to warrant a change in operation of at least one of the liquefiers to account for that momentary increase or decrease in feed availability (e.g. a liquefier operating at a minimum capacity may not receive more feed for a pre-defined period of time that is so short that the change in increased operational capacity and the costs and efficiency losses that can be incurring from the ramping up process associated with such a change is not warranted for the slight time at which the liquefier may operate above the minimum operational capacity threshold). Examples of the empirical data of the liquefiers concerning the efficiency at which the liquefiers operate to liquify the feed can include (i) data taken from offline first principals or analysis data that accounts for the size and configuration of the liquefiers of the apparatus and process conditions or (ii) data derived from plant testing of performance for the liquefiers of the apparatus.

In other embodiments, the control scheme that can be utilized for distribution of the fluid for feeding to a train of liquefiers in different fractionation portions can include one or more of: (1) temperature of the feed and/or ambient temperature at the liquefiers, (2), minimum operational flow rates needed for each of the liquefiers to be operational (e.g. a flow rate of feed for a liquefier to operate at between 20%-30% of its full operational capacity or a flow rate of feed for the liquefier to operate at 20%-40% of its full operational capacity, etc.), (3) empirical data of liquefaction performed by the different liquefiers that indicates which liquefiers may perform liquefaction more efficiently, (4) current flow rates of the portions of feed fed to the liquefiers; (5) a projected feed profile of feed to be provided from upstream feed production equipment (e.g. a projection of a feed of hydrogen to be provided by electrolyzers powered by renewable energy to provide the feed of hydrogen etc.), and/or (6) data related to how the feed available to provide to the liquefiers may change over a pre-selected dead band control period that can be defined to minimize significant operational rate adjustments for liquefiers to avoid sudden ramping up of a liquefier's operational capacity quickly followed by a sudden ramping down of the liquefier (e.g. data for a pre-defined dead band control criteria). An example of a pre-selected dead band control time period can be a pre-selected hysteresis control time period. An example of the projected feed profile of feed to be provided from upstream feed production equipment can include a projection of feed that can be made based on a pre-defined profile of available feed generation that can be provided by upstream feed manufacturing equipment based on solar and/or wind generation profiles in situations where wind and/or solar power provide the power for the equipment used to form the feed. Only one of these items 1-6 can be utilized or a combination of items 1-6 can be utilized in different embodiments (e.g. all of items 1-6, a combination of two or more of items 1-6, a combination of three or more of items 1-6, a combination of 4 of items 1-6, a combination of 5 of items 1-6, etc.).

Other type of liquefier operational status data can also be included in the control scheme. For example, liquefier efficiency in liquefaction of feed from past liquefaction processing, scheduled maintenance and/or estimated need for maintenance, and/or other liquefier operational parameters can be evaluated in conjunction with evaluation of liquefier operational status for determining how to distribute feed to different liquefiers of a train of liquefiers.

In some embodiments, the feed to be fed to the liquefiers can be pre-processed via one or more pre-liquefaction processing systems that can be arranged to purify the feed and provide pre-cooling and pressurization of the feed as may be needed so the feed is suitable for feeding to the liquefiers before the feed is split into multiple fractions. The fractionation or splitting of the feed provided via implementation of an embodiment of our pre-defined control scheme can be provided before the feed is fed to the one or more pre-liquefaction systems in situations where there are multiple such systems. Alternatively (or in addition), the fractionation or splitting of the feed can be provided via implementation of an embodiment of our pre-defined control scheme so that the splitting or fractionation occurs downstream of the pre-liquefaction processing between the feed inlets of the liquefiers and the one or more outlets of the one or more pre-liquefaction processing systems.

For instance, the splitting or fractionation of the feed can occur via a conduit arrangement and/or arrangement of one or more flow splitting mechanisms (e.g. control valves, compander flow setpoint adjustment mechanism, etc.) positioned between one or more liquefaction feed storage units that receive and store the feed output from the one or more pre-liquefaction processing systems and the liquefiers positioned and configured to liquify the feed. As another example, such splitting can occur via conduit arrangement and/or arrangement of one or more flow splitting mechanisms (e.g. control valves or compander flow setpoint control mechanisms) positioned between one or more pre-liquefaction processing systems that output the feed for liquefaction and the one or more liquefiers of the train of liquefiers positioned and configured to liquify that feed.

We surprisingly found that embodiments can be provided to permit greater operational flexibility that can permit liquefaction by multiple liquefiers to receive a feed for undergoing liquefaction while also permitting a more efficient utilization of the liquefiers. In some embodiments, it was surprisingly found that energy efficiency improvements of between 1% and 5% can be provided, which can provide a significant improvement. For example, this type of improvement can be equivalent to 1 MW to 5 MW for an embodiment included in a facility that may require 100 MW of power, which can provide an improvement in operational efficiency that equates to millions of dollars of value in terms of increased efficiency in hydrogen production and/or reduction in energy usage while also providing an improvement in operational flexibility.

In a first aspect, a process for controlling a distribution of feed to a train of liquefiers for liquefaction of the feed is provide. The train of liquefiers can include a plurality of liquefiers (e.g. a first liquefier, a second liquefier, etc.). Embodiments of the process can include determining a flow of feed available for feeding to the train of liquefiers and a current operational status of the liquefiers of the train of liquefiers, determining how to split the feed based on a pre-selected set of control criteria, and communicating instructions to split the flow of the feed for feeding portions of the feed to different liquefiers of the train of liquefiers so each of the liquefiers is operatable at least at a pre-selected minimum operational capacity and power usage for liquefaction of the feed is minimized in accordance with the pre-selected set of control criteria.

In a second aspect, the communicating of the instructions to split the flow of the feed for feeding portions of the feed to different liquefiers of the train of liquefiers can include a controller communicating with one or more flow splitting mechanisms to split the flow of the feed. In some embodiments, each flow splitting mechanism can be a valve (e.g. a control valve, a three way valve, etc.). Other embodiments can utilize other types of flow splitting mechanisms.

In a third aspect, the flow of the feed can be a flow of pre-cooled feed output from at least one pre-liquefaction processing system or a flow of feed that is output from a source of feed. For example, in some embodiments, the feed can include hydrogen gas formed via upstream feed production equipment that includes electrolyzers powered by at least one renewable power source and the determining of how to split the feed based on the pre-selected set of control criteria can include a projected feed profile of feed to be provided from the upstream feed production equipment.

In a fourth aspect, the determining of the flow of feed available for feeding to the train of liquefiers and the current operational status of the liquefiers of the train of liquefiers can include a controller communicating with at least one sensor of a conduit positioned between a source of the feed and the train of liquefiers.

In a fifth aspect, the pre-selected set of control criteria can include one or more of: (1) temperature of the feed and/or ambient temperature at the liquefiers, (2), minimum operational flow rates for each of the liquefiers, (3) empirical data of liquefaction performed by the different liquefiers, (4) current flow rates of the portions of feed fed to the liquefiers; (5) a projected feed profile of feed to be provided from upstream feed production equipment; and/or (6) data related to how the feed available to provide to the liquefiers is changeable over a pre-selected dead band control time period or a pre-selected hysteresis time period. Some embodiments can utilize all six of these control criteria items as well as additional items for the pre-selected set of control criteria. Other embodiments can utilize a combination of two or more of these control criteria items for the pre-selected set of control criteria, three or more of these control criteria items, four or more of these control criteria items, or five or more of these control criteria items.

In some embodiments, the pre-selected hysteresis time period is a time period that is selected to minimize operational rate adjustments for the liquefiers to avoid ramping up operational capacity followed by a ramping down of the operational capacity occurring within the pre-selected hysteresis time period.

In a sixth aspect, the determining of how to split the feed based on the pre-selected set of control criteria can include a model predictive controller utilizing the empirical data of liquefaction to facilitate the determination of how to split the feed based on the pre-selected set of control criteria. In some embodiments, the model predictive controller can be incorporated into a controller or can be a remote device that can communicate with at least one controller.

In a seventh aspect, the process of the first aspect can include one or more features of the second aspect, third aspect, fourth aspect, fifth aspect, and/or sixth aspect. It should therefore be appreciated that other embodiments of the process can include other process steps or features. Examples of such features or process steps can be appreciated from the discussion of exemplary embodiments of a process provided herein.

In an eighth aspect, a control system for controlling a distribution of feed to a train of liquefiers for liquefaction of the feed is provided. The control system can include a controller having a processor connected to a non-transitory computer readable medium. The controller can be communicatively connectable to at least one flow splitting mechanism and at least one sensor of at least one feed conduit arrangement positionable between a train of liquefiers and a source of feed. The controller can be configured to: determine a flow of feed available for feeding to the train of liquefiers and a current operational status of a plurality of liquefiers of the train of liquefiers, determine how to split the feed based on a pre-selected set of control criteria, and communicate with the at least one flow splitting mechanism to split the flow of the feed for feeding portions of the feed to different liquefiers of the train of liquefiers so each of the liquefiers is operatable at least at a pre-selected minimum operational capacity and power usage for liquefaction of the feed is minimized in accordance with the pre-selected set of control criteria.

In a ninth aspect, the pre-selected set of control criteria can include (1) temperature of the feed and/or ambient temperature at the liquefiers, (2), minimum operational flow rates for each of the liquefiers, (3) empirical data of liquefaction performed by the different liquefiers, (4) current flow rates of the portions of feed fed to the liquefiers, (5) a projected feed profile of feed to be provided from upstream feed production equipment, and/or (6) data related to how the feed available to provide to the liquefiers is changeable over a pre-selected hysteresis time period or a pre-selected dead band control time period. As noted above, some embodiments can utilize all six of these control criteria items as well as additional items for the pre-selected set of control criteria and other embodiments can utilize a combination of these control criteria that is less than all six of these items and may or may not include other control criteria.

In some embodiments, the pre-selected hysteresis time period can be a time period that is selected to minimize operational rate adjustments for the liquefiers to avoid ramping up operational capacity followed by a ramping down of the operational capacity occurring within the pre-selected hysteresis time period.

In a tenth aspect, the controller can be configured to communicate with or utilize a model predictive controller to evaluate the empirical data of liquefaction to facilitate the determination of how to split the feed based on the pre-selected set of control criteria.

In an eleventh aspect, the control system can include at least one flow splitting mechanism. The at least one flow splitting mechanism can be connected to a conduit arrangement positioned between the source of the feed and the train of liquefiers. In some embodiments, the at least one flow splitting mechanism can include at least one valve connected to the conduit arrangement or a plurality of valves incorporated into the conduit arrangement.

In a twelfth aspect, the control system can include at least one flow splitting mechanism that is connectable to a conduit arrangement positioned between a pre-liquefaction processing system of the feed configured to pre-cool the feed to a pre-selected liquefaction feed temperature and the train of liquefiers.

In a thirteenth aspect, the control system can also include the pre-liquefaction processing system, the train of liquefiers, and/or at least one conduit arrangement.

In a fourteenth aspect, the control system of the eighth aspect can include one or more features of the ninth aspect, tenth aspect, eleventh aspect, twelfth aspect, and/or thirteenth aspect. It should therefore be appreciated that other embodiments of the control system can include other features. Examples of other features can be appreciated from the discussion of exemplary embodiments provided herein.

In a fifteenth aspect, an apparatus for liquefaction of a fluid can include a source of feed configured to output a feed of fluid. The fluid can include hydrogen gas or be hydrogen gas in some embodiments. The apparatus can also include a conduit arrangement positioned between the source of the feed and a train of liquefiers having a first liquefier and a second liquefier. The apparatus can also include a control system comprising a controller positioned and configured to communicate with at least one flow splitting mechanism and at least one sensor connected to the conduit arrangement. The control system can be configured to: determine a flow of feed available for feeding to the train of liquefiers and a current operational status of the first liquefier and the second liquefier of the train of liquefiers, determine how to split the feed based on a pre-selected set of control criteria, and communicate with the at least one flow splitting mechanism to split the flow of the feed for feeding a first portion of the flow of feed to the first liquefier and a second portion of the flow of feed to the second liquefier so each of the liquefiers is operatable at least at a pre-selected minimum operational capacity and power usage for liquefaction of the feed is minimized in accordance with the pre-selected set of control criteria.

In a sixteenth aspect, the apparatus can also include a pre-liquefaction processing system positioned between the source of the feed and the train of liquefiers. The conduit arrangement can be positioned between the pre-liquefaction system and the train of liquefiers. The conduit arrangement can include a first liquefier feed conduit through which the first portion of the flow of feed is passable to the first liquefier and a second liquefier feed conduit through which the second portion of the flow of feed is passable to the second liquefier.

In some embodiments, the pre-liquefaction system can be configured to pre-cool the feed to a pre-selected liquefaction feed temperature such that the first portion of the flow of the feed is feedable to the first liquefier at the pre-selected liquefaction feed temperature and the second portion of the flow of feed is feedable to the second liquefier at the pre-selected liquefaction feed temperature.

In some embodiments, the pre-liquefaction system can be positioned and configured so that pre-liquefaction processing is optimizable independent of how the first portion of the flow of feed and the second portion of the flow of feed is formed and passed to the first liquefier and the second liquefier.

In a seventeenth aspect, the conduit arrangement of the apparatus can include a first liquefier feed conduit through which the first portion of the flow of feed is passable to the first liquefier and a second liquefier feed conduit through which the second portion of the flow of feed is passable to the second liquefier.

In an eighteenth aspect, the apparatus of the fifteenth aspect can include one or more features of the sixteenth aspect and/or seventeenth aspect. It should be appreciated that embodiments of the apparatus can also include other features or combinations of feature, examples of which can be appreciated from the discussion of exemplary embodiments discussed herein.

In a nineteenth aspect, the apparatus and/or control system can be configured to implement an embodiment of the process of the first aspect, second aspect, third aspect, fourth aspect, fifth aspect, sixth aspect, or seventh aspect.

It should be appreciated that embodiments of the process for liquefaction processing and apparatus for liquefaction processing can utilize various conduit arrangements and process control elements. For example, embodiments may utilize sensors (e.g., pressure sensors, temperature sensors, flow rate sensors, analyzers, concentration sensors, etc.), controllers, valves, piping, and other process control elements. As another example, some embodiments can utilize an automated process control system and/or a distributed control system (DCS). Various different conduit arrangements and process control systems can be utilized to meet a particular set of design criteria.

Other details, objects, and advantages of our process for liquefaction processing, a control system for feeding hydrogen to a liquefaction system having a plurality of liquefiers, a control system for distributing fluid for liquefaction, a system for fluid liquefaction, and methods of making and using the same will become apparent as the following description of certain exemplary embodiments thereof proceeds.

BRIEF DESCRIPTION OF THE DRAWINGS

Exemplary embodiments of our process for liquefaction processing, a control system for feeding hydrogen to a liquefaction system having a plurality of liquefiers, a control system for distributing fluid for liquefaction, a system for fluid liquefaction, and methods of making and using the same are shown in the drawings included herewith. It should be understood that like reference characters used in the drawings may identify like components.

DETAILED DESCRIPTION

Figure 1:
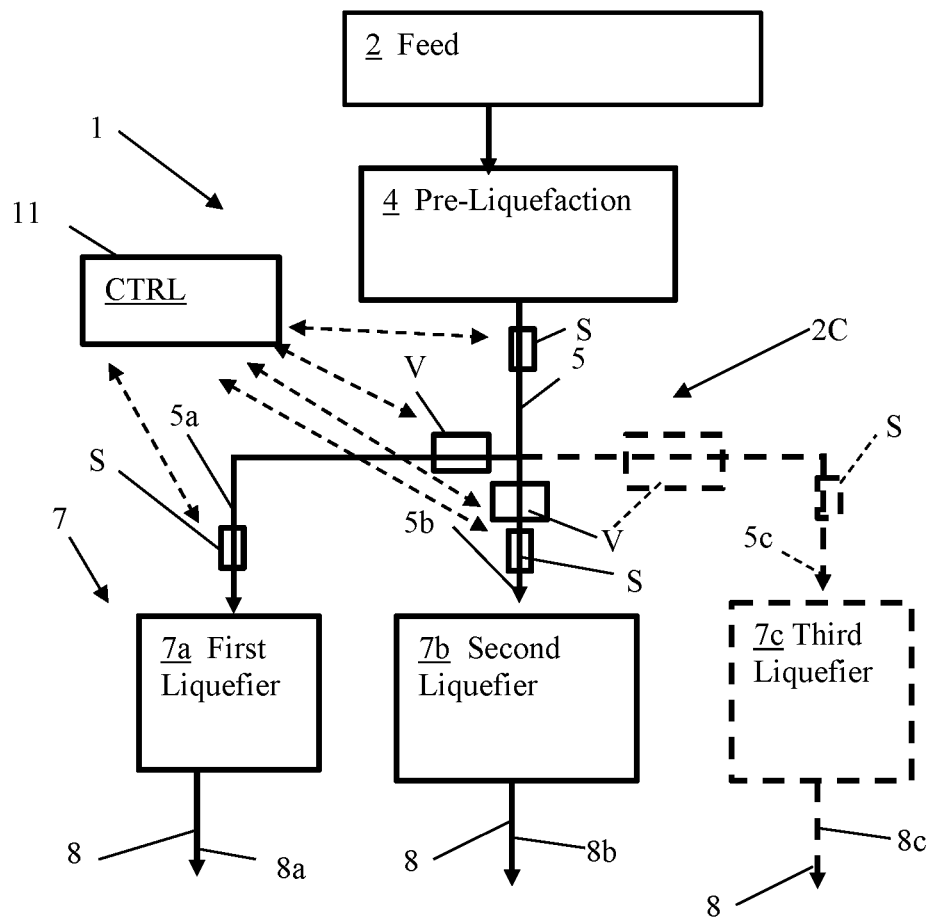
FIG. 1 is a block diagram of a first exemplary embodiment of an apparatus for liquefaction processing that includes a first exemplary embodiment of a control system for distributing fluid for liquefaction.

Referring to FIGS. 1-5, an apparatus for liquefaction processing 1 can include a source of feed 2 (Feed) that can provide at least one stream of feed to at least one pre-liquefaction processing system 4 (Pre-Liquefaction) and/or a train of liquefiers 7. The source of the feed 2 can include one or more electrolyzer houses that include electrolyzers for forming hydrogen gas via electrolysis of water for supplying to the pre-liquefaction system 4. The electrolyzers can be powered via one or more renewable power sources so that the formation of hydrogen is performed via only renewable power or via a significant portion of renewable power for green hydrogen manufacturing.

The feed 2 can be provided by a source that only utilizes renewable energy (e.g. is a zero carbon hydrogen feed) or is a very low carbon source of feed (e.g. is a hydrogen feed provided via a carbon capture based hydrogen production facility, a substantially renewable powered hydrogen production facility, etc.). Such a source of feed 2 can include large variations in supply of feed due to inconsistent power availability (e.g. changes from high wind to low wind conditions for wind power, changes form cloudy to non-cloudy conditions for solar power, etc.).

The hydrogen gas output from the electrolyzers can be the source of the feed 2 fed to the pre-liquefaction processing system 4 via at least one pre-liquefaction processing system feed conduit positioned between the source of the feed 2 and the pre-liquefaction processing system 4 or the source of feed fed to the train of liquefiers 7 via at least one liquefier feed conduit arrangement 2C positioned between the source of the feed 2 and the train of liquefiers 7.

For example, the pre-liquefaction processing system 4 can be positioned between the source of the feed 2 and the train of liquefiers 7 so that a conduit arrangement 2C is positioned between the pre-liquefaction system 4 and the train of liquefiers 7. The conduit arrangement 2C can include a first liquefier feed conduit through which a first portion of a flow of feed is passable to the first liquefier 7a and a second liquefier feed conduit through which a second portion of the flow of feed is passable to a second liquefier 7b. The conduit arrangement 2C can include at least one flow splitting mechanism V (e.g. a valve, etc.) and at least one sensor S. The pre-liquefaction system 4 can be configured to pre-cool the feed to a pre-selected liquefaction feed temperature such that the first portion of the flow of the feed is feedable to the first liquefier 7a at the pre-selected liquefaction feed temperature and the second portion of the flow of feed is feedable to the second liquefier 7b at the pre-selected liquefaction feed temperature.

Figure 5:
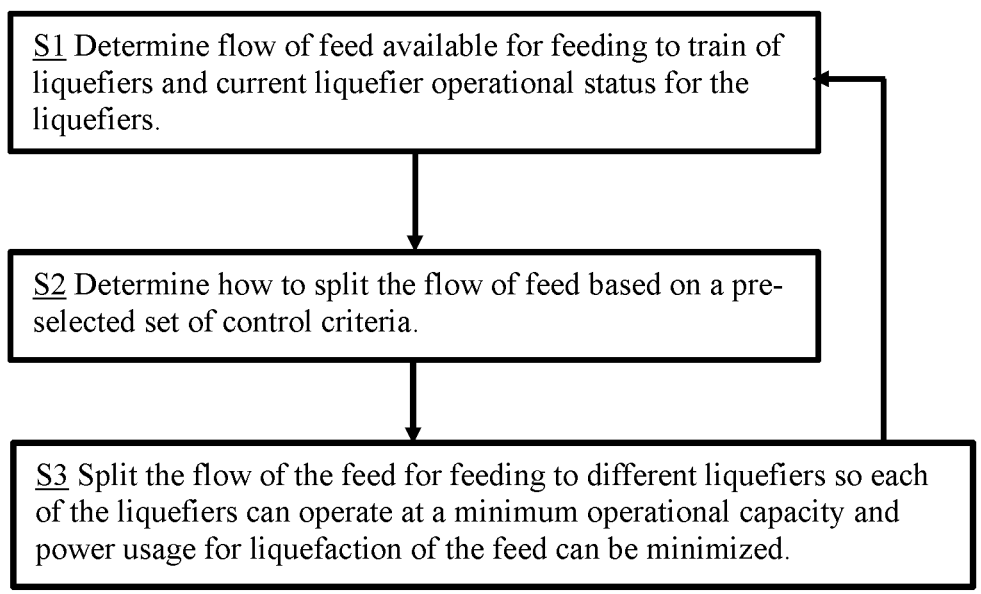
FIG. 5 is a flow diagram of a first exemplary embodiment of a process for liquefaction processing for distributing a feed of fluid to a train of liquefiers for liquefaction. Embodiments of the control system for distributing fluid for liquefaction and embodiments of the apparatus for liquefaction processing can utilize an embodiment of this process. For example, the exemplary embodiments illustrated in FIGS. 1-4 can implement an embodiment of this process.

As another example, embodiments of the apparatus can include a conduit arrangement 2C that has a first liquefier feed conduit through which the first portion of a flow of feed is passable to the first liquefier 7a and a second liquefier feed conduit through which a second portion of the flow of feed is passable to the second liquefier 7b. The conduit arrangement 2C can include at least one flow splitting mechanism V and at least one sensor S and can be adapted so that the feed is providable from the source of the feed 2 to the liquefiers as shown in FIG. 5 for example.

The source of feed 2 can include a storage device or storage unit that can include one or more storage vessels for storage of the hydrogen gas for feeding to the pre-liquefaction system 4. The source of the feed 2 can also include a pre-purification unit configured to purify the hydrogen gas (e.g. by removing hydrocarbons, oxygen and/or water from the feed) and/or a compression system configured to compress the hydrogen gas to a pre-liquefaction processing feed pressure (e.g. a pressure of between 1.1 bara to 40 bara, a pressure of not more than 50 bara, etc.). The compression system can include at least one compressor and the pre-purification unit (PPU) can include one or more adsorbers having adsorbent material therein and/or one or more reactors configured for purification of the feed (e.g. hydrogen gas). Alternatively, the pre-liquefaction processing system 4 can include the pre-purification unit, compression system and/or the storage unit.

The pre-liquefaction processing system 4 can include one or more pre-cooling devices for pre-cooling the feed to a pre-selected liquefaction feed temperature. In some embodiments, the pre-selected liquefaction feed temperature can be a temperature within a pre-selected range of liquefaction feed temperature of between −110° C. and −200° C., between −170° C. and −200°, or be within another suitable temperature range (e.g. between −150° C. and −200° C., etc.). Such a temperature range can be selected for some embodiments in which the feed is hydrogen gas, for example.

The pre-liquefaction feed temperature for the pre-cooled feed for liquefaction 5 can be a temperature that is defined so that each flow of feed is mostly gas or entirely gas. In some embodiments, each flow can be entirely gas, be at least 95 volume precent (vol %) gas and no more than 5 vol % liquid, can be between 100 vol % gas and 90 vol % gas and be between 0 vol % liquid and 10 vol % liquid, or be between 80 vol % gas and 100 vol % gas and between 20 vol % liquid and 0 vol % liquid. It should be appreciated that the pre-cooled feed for liquefaction 5 can therefore be entirely a gas or include a substantial amount of gas and a partial amount of liquid (e.g. be at least 80 vol % gas and no more than 20 vol % liquid, etc.) for feeding to the train of liquefiers to undergo substantial liquefaction for forming a fully liquified or almost entirely liquid product stream 8.

As noted above, the pre-liquefaction processing system 4 can also include one or more pre-purification units (PPUs) and/or compression devices for pressurizing the feed to a pre-selected liquefaction feed pressure and/or purifying the feed to a pre-selected liquefaction feed concentration of hydrogen for feeding to a train of liquefiers 7. The pre-cooled feed can be output from each pre-liquefaction processing system 4 as a stream of pre-cooled feed for liquefaction 5 for feeding the stream of the pre-cooled feed to the train of liquefiers 7 via at least one liquefier feed conduit positioned between the train of liquefiers 7 and the pre-liquefaction processing system 4.

The pre-liquefaction processing system 4 can be positioned and configured for optimization of the pre-cooling equipment independent of the liquefiers of the train of liquefiers 7. This may be optimization of parameters within the pre-cooling process units or in optimization of flow between the pre-cooling units of the pre-liquefaction processing system 4, for example. This optimization of the pre-cooling equipment of the pre-liquefaction processing system 4 can be independent of the determination criteria that can be used for splitting of the flow of feed for feeding to different liquefiers of the train of liquefiers (e.g. an optimization of flows being fed to different liquefiers of the train of liquefiers 7 can be independent of control criteria used for the pre-liquefaction processing system to pre-cool the feed to a pre-liquefaction feed temperature or can be largely independent of optimization of flows within the liquefiers of the train of liquefiers 7).

Each of the liquefiers of the train of liquefiers 7 can include an arrangement of expanders, ortho-hydrogen to para-hydrogen converters, and at least one liquefaction heat exchanger for liquifying the portion of the stream of pre-cooled feed for liquefaction 5 it receives to form an entirely liquid product stream 8 or an almost entirely liquid product stream. The formed liquid product stream 8 can be at a pre-selected liquified product stream temperature or within a pre-selected liquified product stream temperature range (e.g. no higher than −240° C., no higher than −250° C. and no lower than −255° C., between −250° C. and −260° C., between −240° C. and −260° C., no higher than the liquefaction temperature of hydrogen, or no higher than the critical temperature of hydrogen when the feed from the source of feed 2 is hydrogen gas, etc.). For embodiments where the feed from the source of feed 2 includes or is hydrogen gas as noted above, the liquid product stream 8 output by each liquefier can include liquid hydrogen or be liquid hydrogen (e.g. be at least 99 vol % liquid hydrogen, be between 99 vol % liquid hydrogen and 100 vol % liquid hydrogen, etc.). The liquid product streams 8 can be fed to a plant process for use of the liquid hydrogen or can be fed to a liquid hydrogen storage unit for storage and subsequent use and/or transport of the liquid hydrogen.

The train of liquefiers 7 can include multiple liquefiers. For example, the train of liquefiers can include a first liquefier 7a and a second liquefier 7b. The train of liquefiers 7 can also include more than two liquefiers in some embodiments (e.g. a third liquefier 7c shown in FIG. 2 and shown in broken line in FIG. 1 and/or a fourth liquefier 7d shown in FIG. 2, etc.).

As noted above, the feed from the source of the feed 2 can be split into multiple portions. For example, the stream of pre-cooled feed for liquefaction 5 can be split into multiple portions. The splitting of the stream of pre-cooled feed for liquefaction 5 can also be considered a fractionation of the stream. For example, the stream of pre-cooled feed for liquefaction 5 can be split into a first liquefier feed portion 5a to feed to the first liquefier 7a for forming a first stream of liquid 8a and a second liquefier feed portion 5b to feed to the second liquefier 7b for forming a second stream of liquid 8b. The stream of pre-cooled feed for liquefaction 5 can also be split to form a third liquefier feed portion 5c for feeding to a third liquefier 7c for formation of a third stream of liquid 8c. Each portion of the pre-cooled feed for liquefaction 5 can be entirely gaseous or substantially gaseous (e.g. be at least 80 vol % gas and no more than 20 vol % liquid, etc. as noted above).

The forming of the various portions via the splitting of the stream of pre-cooled feed for liquefaction 5 can be controlled via a computer device 11 configured as a controller (CTRL) that can be communicatively connected to one or more flow splitting mechanisms V and sensors S. The flow splitting mechanisms V can include a first liquefier feed valve V positioned in or connected to the first liquefier feed conduit through which the first liquefier feed portion 5a is passable for being fed to the first liquefier 7a and/or a second liquefier feed valve V positioned in or connected to the second liquefier feed conduit through which the second liquefier feed portion 5b is passable for being fed to the second liquefier 7b. Some embodiments may only utilize one such valve and others may utilize both valves.

Embodiments that may utilize additional liquefiers in the train of liquefiers 7 can include other valves V and liquefier feed conduits as well. For example, the valves V can also include a third liquefier feed valve V positioned in or connected to the third liquefier feed conduit through which the third liquefier feed portion 5c is passable for being fed to the third liquefier 7c. Each of the valves can be adjustable between a closed position and an open position and include numerous different intermediate positions between their closed and open positions to adjust the proportion of the stream of pre-cooled feed for liquefaction 5 is included in each of the split portion of this stream. One or more sensors S can also be connected to each of the first liquefier feed conduit, second liquefier feed conduit, and/or third liquefier feed conduit.

The one or more flow splitting mechanisms V and one or more sensors S can be communicatively connected to a controller (CTRL), which can be a computer device 11 that includes a processor connected to at least one transceiver and at least one non-transitory memory. The controller (CTRL) can communicate with the flow splitting mechanisms V to adjust positions of one or more flow splitting mechanisms for controlling how the stream of pre-cooled feed for liquefaction 5 is split for feeding to the liquefiers of the train of liquefiers 7 based on a pre-defined set of control criteria defined in code of at least one automated process control application (App). The controller (CTRL) can run the automated process control application(s) (App) stored in the memory of the controller via its processor (e.g. a hardware processor element, a core processor, another type of processing element, etc.). The application (App) can be defined so that the controller (CTRL) uses one or more data stores stored in the memory of the controller when running the control application (App) as well (e.g. one or more databases, files, or other data stores). The one or more data stores can include data that the controller receives from one or more sensors S as well as other data received from elements of the liquefiers, source of feed 2, and/or pre-liquefaction system 4. The sensor data can be stored in at least one of the data stores (DS) stored in the memory of the controller (CTRL) or stored in memory that is communicatively accessible to the controller (CTRL).

The controller (CTRL) can communicate with the flow splitting mechanisms to facilitate adjustment of the positions of the flow splitting mechanisms (e.g. valves or compander flow setpoints, etc.) so that the stream of pre-cooled feed for liquefaction 5 is split into different proportions for feeding different fractions of the stream of pre-cooled feed for liquefaction 5 to the different liquefiers or so that each liquefier receives a similar fraction for the stream of pre-cooled feed for liquefaction 5 depending on how the pre-defined control criteria run via the controller's processor evaluates the different conditions detected via the sensors S and other data related to liquefier operations.

As can be appreciated from FIG. 1, this flow splitting adjustment can be provided in flow splitting mechanisms V of the conduit arrangement 2C positioned between the pre-liquefaction system 4 and the liquefiers. As can be appreciated from FIG. 2, this adjustment can alternatively (or also) be provided via one or more flow splitting mechanisms V and sensors S positioned in the pre-liquefaction system feed conduit arrangement 2C positioned between the source of the feed 2 and different pre-liquefaction systems 4 when there are more than one pre-liquefaction systems that are utilized. For example, the controller can be communicatively connected to at least one flow splitting mechanism V and at least one sensor S connected to a conduit arrangement 2C positioned between the source of the feed 2 and the pre-liquefaction systems 4 for adjusting a portion of the flow of feed fed from the source of feed 2 to each pre-liquefaction system 4 for adjusting how the streams of pre-cooled feed for liquefaction 5 output from the pre-liquefaction systems 4 are fed to the different liquefiers connected to those systems.

Figure 2:
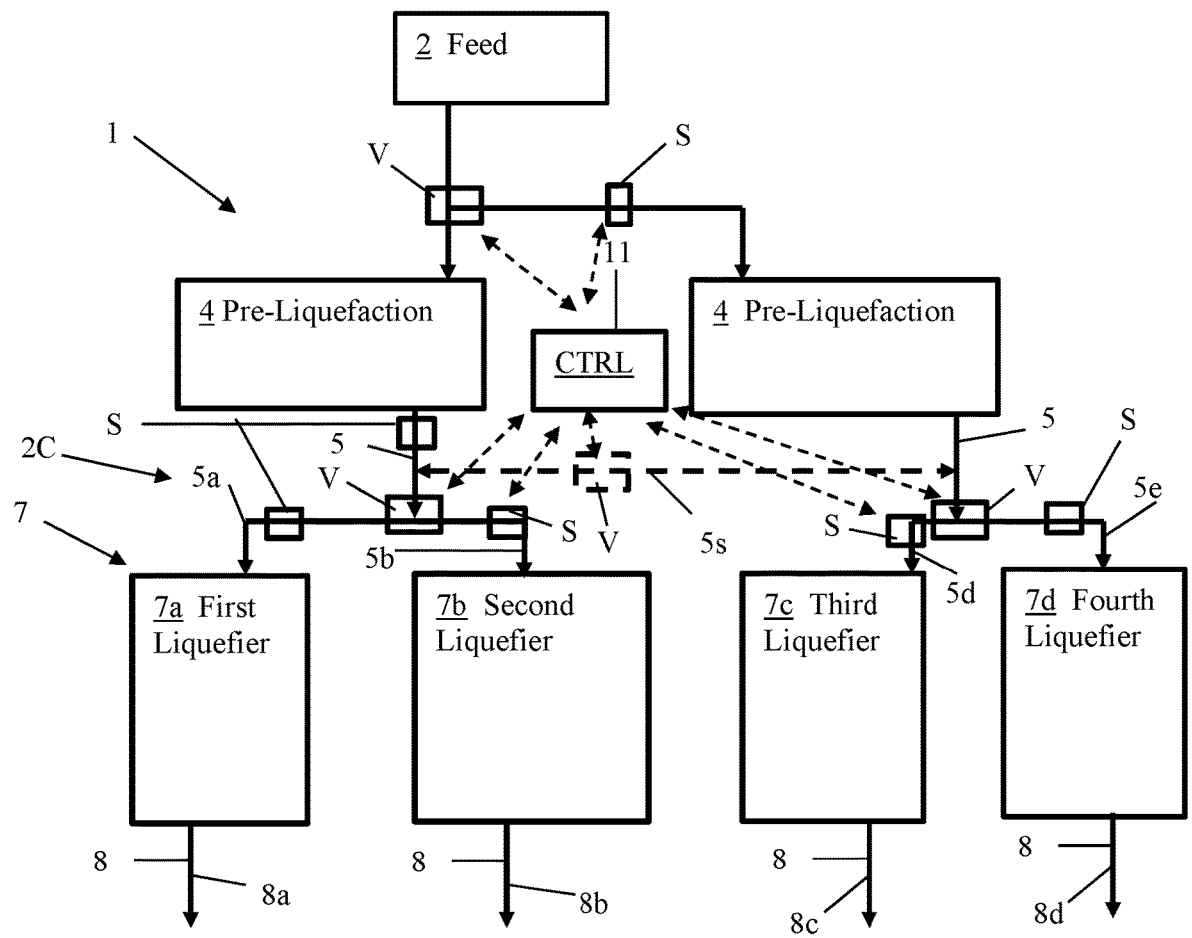
FIG. 2 is a block diagram of a second exemplary embodiment of an apparatus for liquefaction processing that includes a second exemplary embodiment of a control system for distributing fluid for liquefaction.

For example, the apparatus of FIG. 2 can be arranged so that the feed of hydrogen gas or other gas to be liquified is fed to a first pre-liquefaction system 4 and a second pre-liquefaction system 4 via a pre-liquefaction feed conduit arrangement 2C. The feed can be split to form a first portion of the feed for feeding to the first pre-liquefaction system and forming of a second portion of the feed for feeding to the second pre-liquefaction system 4 via at least one feed splitting valve or other type of flow splitting mechanism V communicatively connected to the controller (CTRL).

The first pre-liquefaction system 4 can output a first stream of pre-cooled feed for liquefaction 5 that can be split into a first liquefier feed portion 5a to feed to a first liquefier 7a for forming a first stream of liquid 8a and a second liquefier feed portion 5b to feed to the second liquefier 7b for forming a second stream of liquid 8b. The second pre-liquefaction system 4 can output a second stream of pre-cooled feed for liquefaction 5 that can be split into a third liquefier feed portion 5d to feed to a third liquefier 7c for forming a third stream of liquid 8c and a fourth liquefier feed portion 5e to feed to the fourth liquefier 7d for forming a fourth stream of liquid 8d.

The controller (CTRL) can be communicatively connected to one or more valves V of the first liquefier feed conduit through which the first liquefier feed portion 5a is passable to the first liquefier 7a, one or more valves V of the second liquefier feed conduit through which the second liquefier feed portion 5b is passable to the second liquefier 7b, one or more valves V of the third liquefier feed conduit through which the third liquefier feed portion 5d is passable to the third liquefier 7c, and one or more valves V of the fourth liquefier feed conduit through which the fourth liquefier feed portion 5e is passable to the fourth liquefier for actuation of valve adjustment to adjust how the steams of pre-cooled feed for liquefaction 5 are split for feeding to the different liquefiers. The controller (CTRL) can also be connected to the sensors S of the first liquefier feed conduit, second liquefier feed conduit, third liquefier feed conduit and fourth liquefier feed conduit.

The controller (CTRL) can also be communicatively connected to at least one valve V and at least one sensor S of a supplemental liquefier feed conduit 5s positioned between the pre-liquefaction processing systems 4 and the liquefiers so that the stream of pre-cooled feed for liquefaction 5 output from the first pre-liquefaction processing system 4 can be fed to the third and fourth liquefiers 7c and 7d and the stream of pre-cooled feed for liquefaction 5 output from the second pre-liquefaction processing system 4 can be fed to the first and second liquefiers 7a and 7b as well so that the splitting of a stream of pre-cooled feed for liquefaction 5 output from either pre-liquefaction system can be split into multiple different portions for feeding to all the different liquefiers of the train of liquefiers. This type of supplemental conduit 5s can be positioned to permit a single pre-liquefaction system 5 to provide pre-cooled feed for liquefaction fluid to all the liquefiers in situations where there may be a severe maintenance issue affecting a pre-liquefaction system or where there may be an unexpected occurrence (e.g. unanticipated equipment failure, power outage, etc.). The supplemental conduit 5s can help provide further improvement in operational flexibility to account for such issues.

In yet other embodiments, each of the liquefiers of the train of liquefiers may include pre-cooling devices, purification devices and liquefaction compression systems so the liquefiers can receive feed directly from a source of feed 2 for liquefaction. In such an embodiment, the source of feed 2 can provide a stream of feed for liquefaction 15 that can be split into multiple portions for feeding to different liquefiers of a train of liquefiers (e.g. similar to the arrangement discussed above with respect to the exemplary embodiment of FIG. 1 but without the pre-liquefaction system 4). In such an arrangement, the controller CTRL can be communicatively connected to one or more valves V and one or more sensors S connected to a first liquefier feed conduit through which a first portion 15a of the stream of feed for liquefaction 15 can be passed for feeding to the first liquefier 7a for forming a first stream of liquid 8a. The controller CTRL can also be communicatively connected to one or more valves V and one or more sensors S connected to a second liquefier feed conduit through which a second portion 15b of the stream of feed for liquefaction 15 can be passed for feeding to the second liquefier 7b for forming a second stream of liquid 8b. Also, the controller CTRL can be communicatively connected to one or more valves V and one or more sensors S connected to a third liquefier feed conduit through which a third portion 15c of the stream of feed for liquefaction 15 can be passed for feeding to a third liquefier 7c for forming a third stream of liquid 8c (in embodiments where a third liquefier may be present as indicated by broken line in FIG. 3). If additional liquefiers are provided in the train, the controller can be similarly connected to one or more valves and sensors of other liquefier feed conduits as well.

Figure 3:
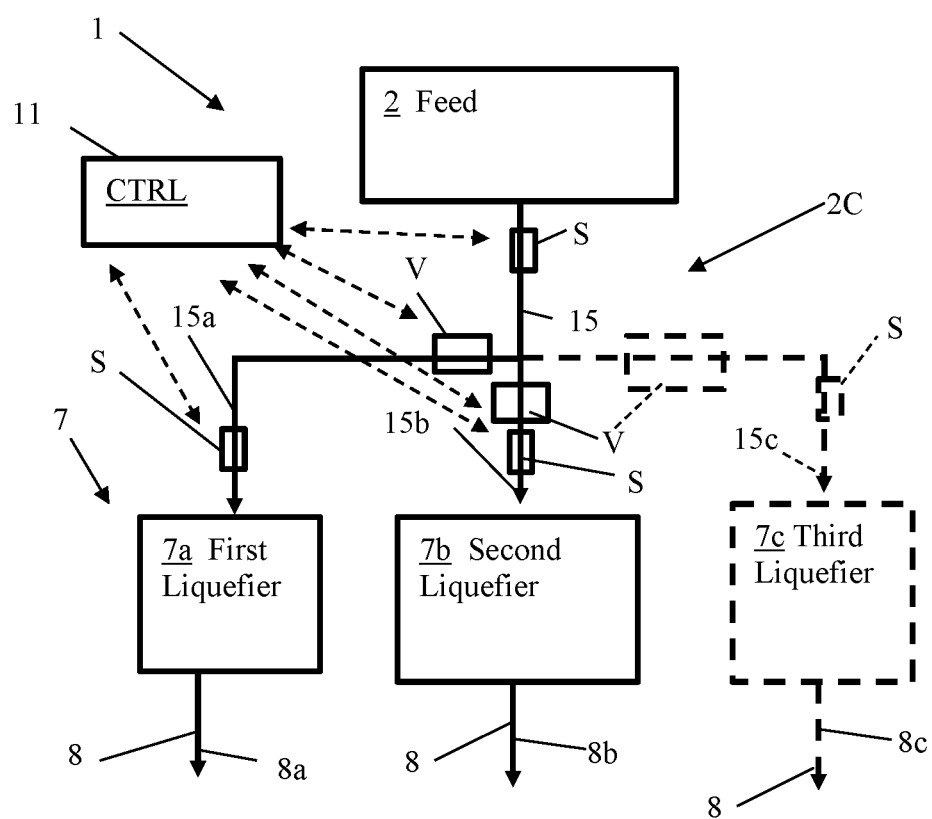
FIG. 3 is a block diagram of a third exemplary embodiment of an apparatus for liquefaction processing that includes a third exemplary embodiment of a control system for distributing fluid for liquefaction.

For an embodiment configured similarly to the exemplary embodiment shown in FIG. 3, the stream of feed for liquefaction 15 fed to the liquefiers may not be pre-cooled and may be at an ambient temperature or other temperature (e.g. between 40° C. and −5° C., between 90° C. and 0° C. or between 90° C. and −10° C., etc.) for feeding to the liquefiers and each liquefier may include its own pre-processing system to facilitate cooling, purification and/or pressurization of the feed for undergoing liquefaction. The controller (CTRL) can be configured to utilize the temperature of the feed of the stream of feed for liquefaction 15 as well as other data in accordance with the pre-defined control criteria for controlling the fraction of the stream of feed for liquefaction 15.

Figure 4:
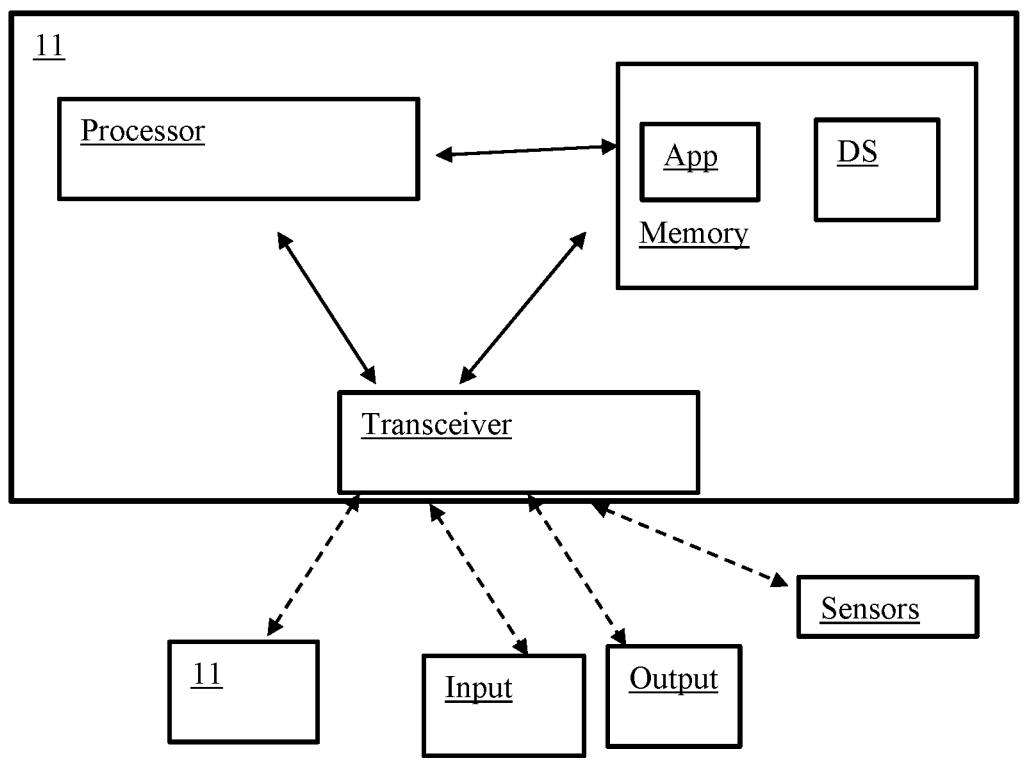
FIG. 4 is a block diagram of an exemplary embodiment of a computer device 11 that can be utilized in the first, second, and/or third exemplary embodiments of the control system for distributing fluid for liquefaction.

FIG. 4 illustrates an exemplary embodiment of a computer device 11. The controller (CTRL) can be a computer device 11. As can be appreciated from FIG. 4, the controller (CTRL) can be a type of computer device that includes a processor connected to a non-transitory memory or other type of non-transitory computer readable medium. The memory can have at least one application (App) and at least one data store (DS) stored thereon. The processor and/or memory and be communicatively connected to at least one transceiver of the computer device 11. The computer device 11 can be communicatively connectable to one or more input devices (Input), output devices (Output), sensors (Sensors) and/or one or more other computer devices 11. Input devices (Input) can include a keyboard, a pointer device, a keypad, a microphone, a touch screen, or other type of input device. Output devices (Output) can include at least one display, a printer, a speaker, or other type of output device. The sensors can include temperature sensors, flow sensors, pressure sensors, analyzers, concentration sensors, and other types of sensors or detection devices.

The other computer devices 11 that can be communicatively connectable to the computer device 11 configured as the controller (CTRL) can be an operator device and/or a host device that can be communicatively connectable to the controller (CTRL) via at least one network connection and/or other type of communicative connection (e.g. local area network connection, internet connection, wide area network connection, etc.). The communicative connection between the controller (CTRL) and the other computer device(s) 11 and/or sensors can include intermediate nodes (e.g. access points, base stations, border control devices, etc.).

In some configurations, the controller (CTRL) can include a model predictive controller included in the application(s) stored in its memory. In other configurations, a model predictive controller can be another type of computer device 11 that is communicatively connectable to the controller (CTRL). In some embodiments, the controller (CTRL) can be communicatively connectable to an operator device so that the operator device can provide input from an operator to the controller (CTRL) by use of the operator device's input devices and a communication interface between the operator device and the controller (CTRL). Such communications can facilitate adjustment of control parameters or other settings or parameters utilized by the controller (CTRL), for example.

FIG. 5 illustrates a flow chart of a control scheme that can be utilized by the controller (CTRL) for controlling how the one or more streams of feed for liquefaction 15 or at least one stream of pre-cooled feed for liquefaction 5 is split into different portions for feeding to different liquefiers of a train of liquefiers. The processing control scheme can be pre-defined via code of the application (App) stored on the controller (CTRL) that is executable by the processor of the controller. The process can also be considered a process for liquefaction processing or a process for distributing a feed of fluid to a train of liquefiers for liquefaction of the feed.

Embodiments of the process can include a first step S1 that can utilize sensor data received from one or more sensors to determine a flow of feed available for feeding to a train of liquefiers and the current liquefier operational status of the liquefiers. The operational status of the liquefiers can include, for example, operational efficiency of the liquefiers at liquifying a feed of fluid, scheduled maintenance and/or estimated needs for maintenance of the liquefiers, and/or other operational parameters that can affect liquefier operational performance. A determination of the liquefiers' efficiency in liquifying a feed can be based on empirical data concerning past liquefaction performance of the liquefiers as well as maintenance related data or other parameters, for example. Examples of empirical data of the liquefiers concerning the efficiency at which the liquefiers operate to liquify the feed can include data taken from offline first principals or analysis data that accounts for the size and configuration of the liquefiers of the apparatus and process conditions for the liquefiers or (ii) data derived from testing of the performance for the liquefiers of the apparatus.

As can be appreciated from the above, the flow of feed available for feeding to a train of liquefiers can be determined based on the flow of feed provided by the source of feed 2 and/or the at least one stream of pre-cooled feed for liquefaction 5 output by one or more pre-liquefaction processing systems 4. As noted above, the feed to be fed to the liquefiers can be entirely gaseous or can be substantially gaseous (e.g. be between 100 vol % gas and 80 vol % gas and be between 0 vol % liquid and 20 vol % liquid, etc.).

In a second step S2, the controller (CTRL) can determine how to split the flow of feed based on a pre-selected set of control criteria. This determination can be based on an evaluation of sensor data and other data stored in at least one data store as well as other more recent and/or real-time sensor data. The pre-selected set of control criteria can include an evaluation of (1) temperature of the feed and/or ambient temperature at the liquefiers, (2), minimum operational flow rates needed for each of the liquefiers to be operational (e.g. a flow rate of feed for a liquefier to operate at between 10%-25% of its full operational capacity or a flow rate of feed for the liquefier to operate at 10%-40% of its full operational capacity, etc.), (3) empirical data of liquefaction performed by the different liquefiers that indicates which liquefiers may perform liquefaction more efficiently, (4) current flow rates of the portions of feed fed to the liquefiers; (5) a projected feed profile of feed to be provided from upstream feed production equipment (e.g. a projection of a feed of hydrogen to be provided by electrolyzers powered by renewable energy to provide the feed of hydrogen etc.), and/or (6) data related to how the feed available to provide to the liquefiers may change over a pre-selected dead band control time period that can be defined to minimize significant operational rate adjustments for liquefiers to avoid sudden ramping up of a liquefier's operational capacity quickly followed by a sudden ramping down of the liquefier (e.g. data related to a pre-selected dead band control criteria). In some embodiments, the empirical data of liquefaction performed by the different liquefiers that indicates which liquefiers may perform liquefaction more efficiently can include (i) data taken from offline first principals or analysis data that accounts for the size and configuration of the liquefiers of the apparatus or (ii) data derived from plant testing of performance for the liquefiers of the apparatus.

An example of the projected feed profile of feed to be provided from upstream feed production equipment can include a projection of feed that can be made based on a pre-defined profile of available feed generation that can be provided by upstream feed manufacturing equipment based on solar and/or wind generation profiles in situations where wind and/or solar power provide the power for the equipment used to form the feed. For instance, in a situation where feed of hydrogen is provided via upstream manufacturing equipment that can include electrolyzers powered by solar and/or wind power, the projected feed can be determined based on the available hydrogen formation capacity that can be provided based on solar and/or wind generation profiles. This projection can be used to adjust splitting of the feed to the liquefiers.

Only one of these items 1-6 can be utilized or a combination of items 1-6 can be utilized in different embodiments (e.g. all of items 1-6, a combination of two or more of items 1-6, a combination of three or more of items 1-6, a combination of four or more of items 1-6, or a combination of 5 of items 1-6, etc.). Additional data related to other criteria can also be considered in the evaluation of the pre-selected set of control criteria performed in the second step S2 for some embodiments.

In a third step S3, the flow of the feed can be split for distributing the split feed to the liquefiers based on the determination performed in the second step S2. For example, the splitting of the flow of the feed can be performed so that each of the liquefiers can operate at a minimum operational capacity and power usage for liquefaction of the feed can be minimized. Such a splitting can be effected based on the determination made by the controller in the second step S2 and the controller communicating with flow splitting mechanisms V to adjust the flow of feed to the different liquefiers based on the determination made in the second step S2, for example.

Embodiments of the process shown in FIG. 5 can be employed in numerous different ways. A non-limiting example of an implementation of an embodiment of this exemplary control scheme is provided below to help further illustrate how the control scheme can be employed. Of course, other embodiments may utilize yet other variations on such processing.

For example, a feed may be initially available a first rate that permits both liquefiers to be operated at 100% capacity. In such a condition, the feed may be split into two equal portions for providing to a first liquefier and a second liquefier in a situation where the train of liquefiers has two liquefiers. If there were three liquefiers or more than three liquefiers in the train of liquefiers, the flow could be split so that there were three equal portions etc. The overall flow of feed fed to the train of liquefiers 7 is the first rate of feed. However, each liquefier has a specific feed rate fed to that liquefier based on the fractionation of the feed, or splitting of the feed.

Thereafter, a change in available feed can be detected from sensor data and/or projected feed profile of the feed and a change in the fractionation of the feed can be made. Such a change could be based on empirical liquefier performance and other factors in accordance with the pre-selected set of control criteria as noted above. This evaluation could result in the flow of feed being split so that the first liquefier is fed 80% of the feed and the second liquefier is fed 20% of the feed so that the second liquefier operates at a minimum operational capacity, for example. As noted above, the overall feed rate fed to the train of liquefiers is the flow of feed fed to the apparatus, however the fractionation of the feed can be adjusted so the feed is split between the different liquefiers of the train of liquefiers and different liquefiers receive a different portion of that overall flow of feed. The splitting of the feed could then be implemented to adapt to such a determination in the change of feed to be provided so a first portion of the feed is fed to the first liquefier so the first liquefier operates at a relatively high operational capacity and receives 80% of the flow of feed and the second liquefier receives the second portion of the feed and operates at its minimum capacity.

Thereafter, another change in available feed may be detected that indicates that there is an increase in available feed. However, this increased amount of available feed is detected as only being available for a relatively short period of time that is within a pre-selected hysteresis period of time or other type of pre-selected dead band control period of time. As a result, the splitting of the feed may only be adjusted so that the rate of feed fed to the second liquefier stays that same and the first liquefier receives more feed to operate closer to its full operational capacity condition.

Thereafter, yet another change in available feed may be detected that indicates that there is an increase in available feed and that this increased amount of available feed is detected as being available for longer than the pre-selected hysteresis period of time or other type of pre-selected dead band control period of time. As a result, the splitting of the feed may be adjusted so that the rate of feed fed to the second liquefier is increased and the rate of feed fed to the first liquefier is either also increased or remains the same such that the second liquefier receives a greater proportion of the flow of overall feed.

The available feed may subsequently change numerous other times as the processing continues. The adjustment in fractionation of the feed can continue as can be appreciated from the above in accordance with the pre-selected control criteria.

Embodiments of our process for liquefaction processing for distributing a feed of fluid to a train of liquefiers for liquefaction can also include additional steps. For example, additional steps of the controller exchanging communications with one or more computer devices 11 (e.g. a model predictive controller computer device, an operator device, etc.), and the controller communicating with sensors S and flow splitting mechanisms V (e.g. valves, etc.) can be performed. For example, in conjunction with the second step, the controller can communicate with a model predictive controller computer device to receive data related to past empirical liquefaction performance of the liquefiers to facilitate an evaluation of which liquefiers may liquify more efficiently at particular feed rates and/or ambient temperatures that can be utilized in selection of the proportion, or fractionation, of the feed for splitting the feeds for providing portions of the feed to the different liquefiers.

As yet another example of additional process steps, embodiments of the process can also include retrofitting the controller into an apparatus for liquefaction or upgrading software of a controller and/or installing conduit arrangements, flow splitting mechanisms V, sensors S, and/or liquefaction apparatus equipment. Embodiments of the process can also utilize other steps or other criteria.

Embodiments of a process for liquefaction of a feed can also be appreciated from the exemplary process shown in FIG. 5 and discussed above. Embodiments of such a process can include the steps of our exemplary process for liquefaction processing for distributing a feed of fluid to a train of liquefiers for liquefaction, for example.

In some embodiments, it was surprisingly found that energy efficiency improvements of between 1% and 5% can be provided, which can provide a significant improvement. For example, this type of improvement can be equivalent to 1 MW to 5 MW for an embodiment included in a facility that may require 100 MW of power, which can provide an improvement in operational efficiency that equates to millions of dollars of value in terms of increased efficiency in hydrogen production and/or reduction in energy usage while also providing an improvement in operational flexibility. For example, embodiments can be provided so that the energy savings that can be achieved can be provided for improved hydrogen production via the source of the feed and/or a reduction in operational cost and improved use of renewable energy while also providing a reduction in operational costs that can make utilization of renewable power for hydrogen production more cost effective for more widespread utilization of renewable power sources.

It should be appreciated that modifications to the embodiments explicitly shown and discussed herein can be made to meet a particular set of design objectives or a particular set of design criteria. For instance, the arrangement of flow splitting mechanisms, piping, and other conduit elements (e.g. conduit connection mechanisms, tubing, seals, etc.) for interconnecting different units of the plant for fluid communication of the flows of fluid between different elements (e.g. pumps, conduits, valves, etc.) can be arranged to meet a particular plant layout design that accounts for available area of the plant, sized equipment of the plant, and other design considerations. As another example, the flow rate, pressure, and temperature of the fluid passed through the various apparatus or system elements can vary to account for different design configurations and other design criteria.

Embodiments of a plant, the apparatus for pre-liquefaction processing, process for pre-liquefaction processing, system for hydrogen liquefaction, and/or system for fluid liquefaction can each be configured to include process control elements positioned and configured to monitor and control operations (e.g. temperature and pressure sensors, flow sensors, an automated process control system having at least one work station that includes a processor, non-transitory memory and at least one transceiver for communications with the sensor elements, valves, and controllers for providing a user interface for an automated process control system that may be run at the work station and/or another computer device of the plant, etc.).

As another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of the process, apparatus, system, and methods of making and using the same have been shown and described above, it is to be distinctly understood that the invention is not limited thereto but may be otherwise variously embodied and practiced within the scope of the following claims.

What is claimed is:

1. A process for controlling a distribution of feed to a train of liquefiers for liquefaction of the feed, the train of liquefiers comprising a plurality of liquefiers, the process comprising:
   determining a flow of feed available for feeding to the train of liquefiers and a current operational status of the liquefiers of the train of liquefiers;
   determining how to split the feed based on a pre-selected set of control criteria; and
   communicating instructions to split the flow of the feed for feeding portions of the feed to different liquefiers of the train of liquefiers so each of the liquefiers is operatable at least at a pre-selected minimum operational capacity and power usage for liquefaction of the feed is minimized in accordance with the pre-selected set of control criteria.

2. The process of claim 1, wherein the communicating of the instructions comprises a controller communicating with one or more flow splitting mechanisms to split the flow of the feed.

3. The process of claim 1, wherein the flow of the feed is a flow of pre-cooled feed output from at least one pre-liquefaction processing system or a flow of feed that is output from a source of feed.

4. The process of claim 3, wherein the feed comprises hydrogen gas formed via upstream feed production equipment that includes electrolyzers powered by at least one renewable power source and wherein the determining of how to split the feed based on the pre-selected set of control criteria includes a projected feed profile of feed to be provided from the upstream feed production equipment.

5. The process of claim 1, wherein the determining of the flow of feed available for feeding to the train of liquefiers and the current operational status of the liquefiers of the train of liquefiers comprises a controller communicating with at least one sensor of a conduit positioned between a source of the feed and the train of liquefiers.

6. The process of claim 1, wherein the pre-selected set of control criteria comprises:
   (1) temperature of the feed and/or ambient temperature at the liquefiers,
   (2), minimum operational flow rates for each of the liquefiers,
   (3) empirical data of liquefaction performed by the different liquefiers,
   (4) current flow rates of the portions of feed fed to the liquefiers,
   (5) a projected feed profile of feed to be provided from upstream feed production equipment, and/or
   (6) data related to how the feed available to provide to the liquefiers is changeable over a pre-selected dead band control time period or a pre-selected hysteresis time period.

7. The process of claim 6, wherein the pre-selected hysteresis time period is a time period that is selected to minimize operational rate adjustments for the liquefiers to avoid ramping up operational capacity followed by a ramping down of the operational capacity occurring within the pre-selected hysteresis time period.

8. The process of claim 6, wherein the determining of how to split the feed based on the pre-selected set of control criteria comprises a model predictive controller utilizing the empirical data of liquefaction to facilitate the determination of how to split the feed based on the pre-selected set of control criteria.

9. A control system for controlling a distribution of feed to a train of liquefiers for liquefaction of the feed, the control system comprising:
a controller having a processor connected to a non-transitory computer readable medium, the controller being communicatively connectable to at least one flow splitting mechanism and at least one sensor of at least one feed conduit arrangement positionable between a train of liquefiers and a source of feed, the controller configured to:
determine a flow of feed available for feeding to the train of liquefiers and a current operational status of a plurality of liquefiers of the train of liquefiers;
determine how to split the feed based on a pre-selected set of control criteria; and
communicate with the at least one flow splitting mechanism to split the flow of the feed for feeding portions of the feed to different liquefiers of the train of liquefiers so each of the liquefiers is operatable at least at a pre-selected minimum operational capacity and power usage for liquefaction of the feed is minimized in accordance with the pre-selected set of control criteria.

10. The control system of claim 9, wherein the pre-selected set of control criteria comprises:
(1) temperature of the feed and/or ambient temperature at the liquefiers,
(2), minimum operational flow rates for each of the liquefiers,
(3) empirical data of liquefaction performed by the different liquefiers,
(4) current flow rates of the portions of feed fed to the liquefiers,
(5) a projected feed profile of feed to be provided from upstream feed production equipment, and/or
(6) data related to how the feed available to provide to the liquefiers is changeable over a pre-selected hysteresis time period or a pre-selected dead band control time period.

11. The control system of claim 10, wherein the pre-selected hysteresis time period is a time period that is selected to minimize operational rate adjustments for the liquefiers to avoid ramping up operational capacity followed by a ramping down of the operational capacity occurring within the pre-selected hysteresis time period.

12. The control system of claim 9, wherein the controller is configured to communicate with or utilize a model predictive controller to evaluate the empirical data of liquefaction to facilitate the determination of how to split the feed based on the pre-selected set of control criteria.

13. The control system of claim 9, comprising:
the at least one flow splitting mechanism, the at least one flow splitting mechanism connected to a conduit arrangement positioned between the source of the feed and the train of liquefiers.

14. The control system of claim 9, comprising:
the at least one flow splitting mechanism, the at least one flow splitting mechanism connectable to a conduit arrangement positioned between a pre-liquefaction processing system of the feed configured to pre-cool the feed to a pre-selected liquefaction feed temperature and the train of liquefiers.

15. The control system of claim 14, comprising:
the pre-liquefaction processing system, the train of liquefiers, and the conduit arrangement.

16. An apparatus for liquefaction of a fluid comprising:
a source of feed configured to output a feed of fluid, the fluid comprising hydrogen gas,
a conduit arrangement positioned between the source of the feed and a train of liquefiers;
the train of liquefiers having a first liquefier and a second liquefier,
a control system comprising a controller positioned and configured to communicate with at least one flow splitting mechanism and at least one sensor connected to the conduit arrangement, the control system configured to:
determine a flow of feed available for feeding to the train of liquefiers and a current operational status of the first liquefier and the second liquefier of the train of liquefiers;
determine how to split the feed based on a pre-selected set of control criteria; and
communicate with the at least one flow splitting mechanism to split the flow of the feed for feeding a first portion of the flow of feed to the first liquefier and a second portion of the flow of feed to the second liquefier so each of the liquefiers is operatable at least at a pre-selected minimum operational capacity and power usage for liquefaction of the feed is minimized in accordance with the pre-selected set of control criteria.

17. The apparatus of claim 16, comprising:
a pre-liquefaction processing system positioned between the source of the feed and the train of liquefiers, the conduit arrangement being positioned between the pre-liquefaction system and the train of liquefiers, the conduit arrangement including a first liquefier feed conduit through which the first portion of the flow of feed is passable to the first liquefier and a second liquefier feed conduit through which the second portion of the flow of feed is passable to the second liquefier.

18. The apparatus of claim 17, wherein the pre-liquefaction system is configured to pre-cool the feed to a pre-selected liquefaction feed temperature such that the first portion of the flow of the feed is feedable to the first liquefier at the pre-selected liquefaction feed temperature and the second portion of the flow of feed is feedable to the second liquefier at the pre-selected liquefaction feed temperature.

19. The apparatus of claim 18, wherein the pre-liquefaction system is positioned and configured so that pre-liquefaction processing is optimizable independent of how the first portion of the flow of feed and the second portion of the flow of feed is formed and passed to the first liquefier and the second liquefier.

20. The apparatus of claim 16, wherein the conduit arrangement comprises a first liquefier feed conduit through which the first portion of the flow of feed is passable to the first liquefier and a second liquefier feed conduit through which the second portion of the flow of feed is passable to the second liquefier.

* * * * *